United States Patent [19]

Queau

[11] Patent Number: 5,125,610

[45] Date of Patent: Jun. 30, 1992

[54] PORTABLE INFORMATION PROCESSING DEVICE WITH ADJUSTABLE SCREEN

[75] Inventor: Michel Queau, Issy Les Moulineaux, France

[73] Assignee: Telemecanique, France

[21] Appl. No.: 613,831

[22] PCT Filed: Mar. 30, 1990

[86] PCT No.: PCT/FR90/00222

§ 371 Date: Nov. 29, 1990

§ 102(e) Date: Nov. 29, 1990

[87] PCT Pub. No.: WO90/12356

PCT Pub. Date: Oct. 18, 1990

[30] Foreign Application Priority Data

Mar. 31, 1989 [FR] France ................ 89 04235

[51] Int. Cl.[5] .................................. E04G 3/00
[52] U.S. Cl. ................................ 248/284; 248/921; 248/922; 403/158; 403/161
[58] Field of Search .......... 248/284, 291, 274, 276, 248/919, 920, 921, 922, 923, 282; 403/158, 161, 163

[56] References Cited

U.S. PATENT DOCUMENTS

| | | | |
|---|---|---|---|
| 3,188,679 | 6/1965 | Wubbe | 403/161 X |
| 4,620,808 | 11/1986 | Kurtin et al. | 248/282 X |
| 4,624,434 | 11/1986 | Lake, Jr. et al. | 248/454 |
| 4,781,422 | 11/1988 | Kimble | 312/72 |
| 4,834,329 | 5/1989 | Delapp | 248/923 X |
| 5,000,608 | 3/1991 | Schmidt | 248/284 X |

FOREIGN PATENT DOCUMENTS

| | | |
|---|---|---|
| 0257589 | 3/1988 | European Pat. Off. |
| 0493751 | 8/1970 | Switzerland |
| 2190703 | 11/1987 | United Kingdom |
| 2200783 | 8/1988 | United Kingdom |

*Primary Examiner*—Ramon O. Ramirez
*Attorney, Agent, or Firm*—William A. Drucker

[57] ABSTRACT

The device includes, on the one hand, a main body with a base (2) and, on the other hand, screen-type dialogue means (7) which are placed in a flat casing connected to the main body (2) by support means, and means for maintaining the angular position (14) which can be regulated both for height and for angle. Said means for maintaining the angular position (14) are arranged coaxially to a pivoting axis XX' of a support arm (15) on the body (2) and include a free-wheel device mechanically located in series with a friction angular coupling device. The invention makes it considerably easier to adjust the position of the dialogue means.

13 Claims, 3 Drawing Sheets

PORTABLE INFORMATION PROCESSING DEVICE WITH ADJUSTABLE SCREEN

The present invention relates to an information processing device in the form of a portable case comprising, a main body with a base intended to receive a power supply and processing circuits and, screen and/or keyboard dialogue means which are disposed in a flat box connected to the main body by means for supporting it and holding it in an angular position, which are adjustable both in height and angularly.

Generally, in the known apparatus of this kind the screen is connected to the main body via at least one lever articulated to the main body and to the screen by two respective articulations spaced apart and directed parallel to each other. In this case, the screen is held in position by friction linings acting at the level of the articulations.

This method of holding in the angular position has numerous drawbacks.

Thus, in the case where it is desired to obtain firm holding in position, linings should be used providing a high friction coefficient. It is then ascertained that the force to be exerted for carrying out an adjustment becomes high and that further, because of the preponderance of the static friction coefficient with respect to the dynamic friction coefficient, it becomes practically impossible to obtain accurate adjustment.

Furthermore, when it is desired to bring the screen into a top position, the traction effected on the screen causes an elevation of the main body without obtaining the desired result.

The purpose of the invention is particularly to overcome these drawbacks.

It provides an apparatus of the above type characterized in that the adjustable holding means are disposed coaxially to a pivoting axis XX' of at least one support arm articulated on the main body and comprise a free wheel device directed so as to allow a free elevation of the flat box with respect to the main body, said free wheel device being placed mechanically in series with an angular friction coupling device, these two devices being themselves coaxial with each other.

It is clear that, with such an arrangement, it is possible to raise the flat box without meeting any substantial resistance and without risking raising the main body. On the other hand, the force required for lowering the flat box takes place in the direction of the base of the main body, which rests on a working surface. This force may then be relatively high without any drawback resulting therefrom.

Embodiments of the invention will be described hereafter, by way of non limitative examples, with reference to the accompanying drawings in which.

Figure 1:
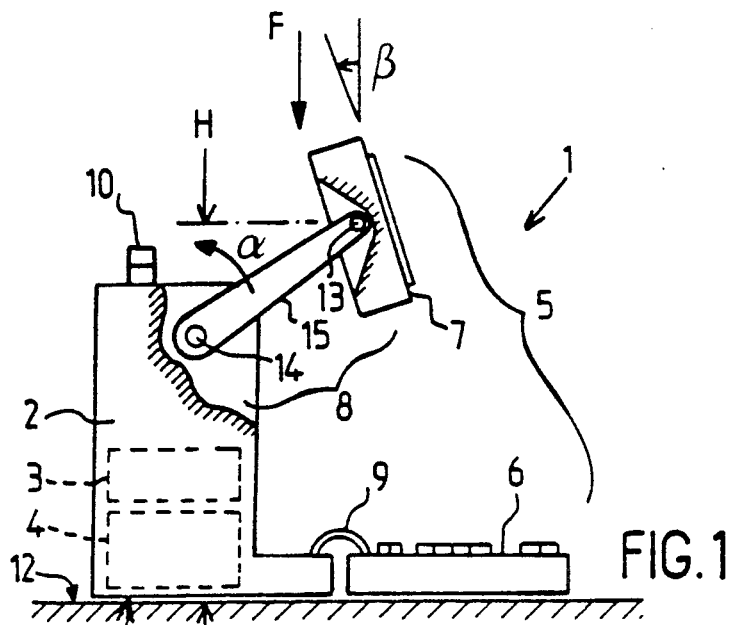
FIG. 1 is a schematic side view of a processing device in a case.

In the example shown in FIG. 1, the information processing apparatus 1 comprises a main body 2 housing a power supply 3 and processing circuits 4, a terminal 5 comprising a keyboard 6 and a screen 7 and means 8, respectively 9, for connecting the latter mechanically and electrically to the main body.

The main body comprises a handle 10 for transporting it and a base 11 for setting it down on a reception surface 12. In this example, orientable connection means 8 make it possible to give to the screen 7 a chosen position in height —H— whereas an angular orientation —β— may be communicated thereto by means of an articulation 13, this articulation 13, as well as an articulation 14 fast with the body, and an arm 15 form said connecting means.

The display screen may comprise all or part of the keys here disposed on a separate keyboard, according to the particular dialogue needs.

Figure 2:
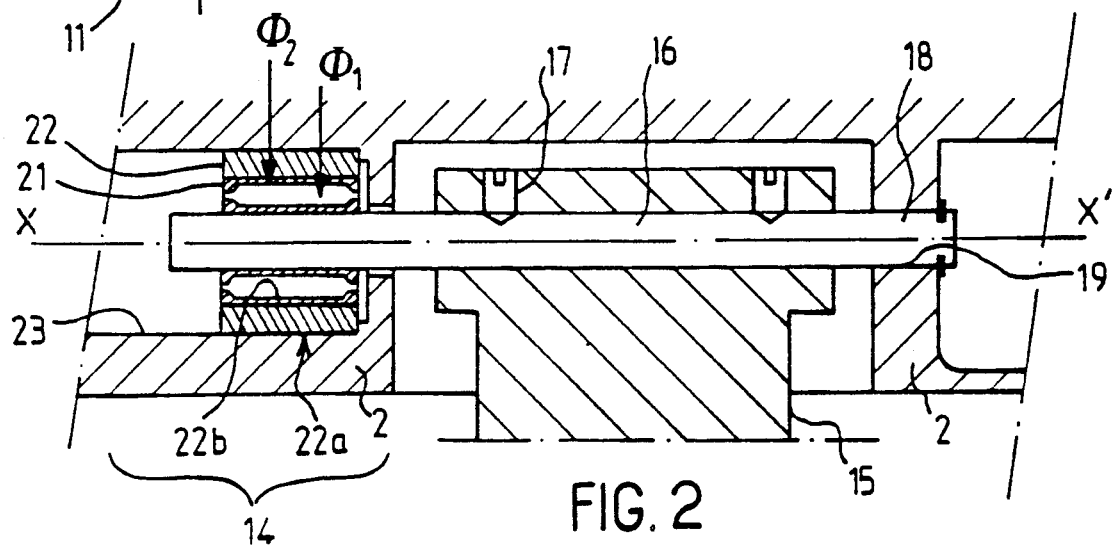
FIG. 2 is a schematic axial section of an articulation of the apparatus shown in FIG. 1, equipped with a free wheel device and an angular friction coupling device.

As can be seen more particularly in FIG. 2, at the level of articulation 14, arm 15 is made fast with a free shaft with axis XX', 16, for example by means of locking screws 17 whereas one end 18 of this shaft 16 pivots in a bearing 19 of the main body 2.

An opposite end 20 of this shaft 16 passes through and is fitted with clamping in the central bore of a free wheel device 21, whereas a friction coupling device 22 is disposed between this free wheel and a concentric bore 23 of the main body 2.

In other words, the two devices (free wheel and friction coupling) are placed radially one about the other, the diameter $\phi_1$ of the free wheel device being less than the diameter $\phi_2$ of the friction coupling device.

In this example, the friction coupling device 21 uses a friction ring, preferably radially and resiliently compressible, mounted between bore 23 and the external cylindrical surface of the free wheel device 21, clamping of this friction ring against said bore and said external surface being obtained by appropriate values given to the respective diameters of the cylindrical coaxial surfaces of the friction ring.

The free wheel property is directed in direction $\alpha$ in FIG. 1 and the positive coupling property is directed in the opposite direction, so that screen 7 may be raised by operating lever 15 but without communicating a parasite force to the main body. As soon as the required height —H— has been given to the screen, the latter will remain in position because of the holding torque developed by the friction coupling device. When the apparatus is set or when its height is adjusted by exerting a force on screen 7 in direction F, the free wheel remains locked and slipping of the friction coupling can be observed. This action does not cause a movement of the main body since base 11 thereof rests on the working surface 12.

Figure 3:
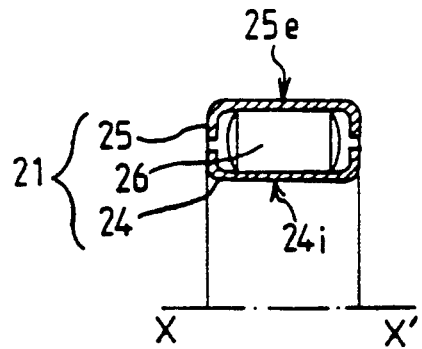
FIG. 3 is an axial section on a larger scale of the free wheel device used in FIG. 2.
Figure 4:
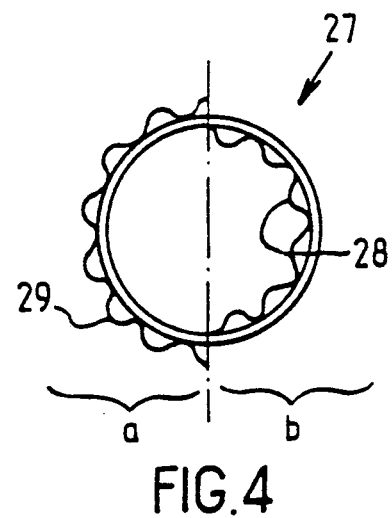
FIG. 4 is a cross section of two variants of friction linings which can be used in the articulation shown in FIG. 2, one of the variants being situated on side a of the Figure whereas the other variant is shown on side b.

In the advantageous embodiment shown in FIG. 3, the free wheel device 21 is formed by two cages 24, 25 between which needles or rollers 26 are disposed. One of these two cages, namely the inner cage 24, has a smooth cylindrical inner surface $24_i$, whereas the other cage 25 has a smooth cylindrical outer surface $25_e$. Resilient means not shown exert on these needles tangential forces which, in relation with oblique internal surfaces of a cage, cause engagement in a single angular direction. The internal cage 24 is force fitted on shaft 16 and the external cage 25 is fitted inside a metal ring 27, two versions of which are illustrated in FIG. 4 (side a and side b). This ring 27 has over a fraction at least of its axial length resilient corrugations 28, 29 which cause a well defined clamping torque to appear by resilient deformation between cage 25 and the bore 23 of the body. These two devices or closely related devices are sold commercially for example under the trademarks "INA-HF" and respectively "STAR".

Figure 5:
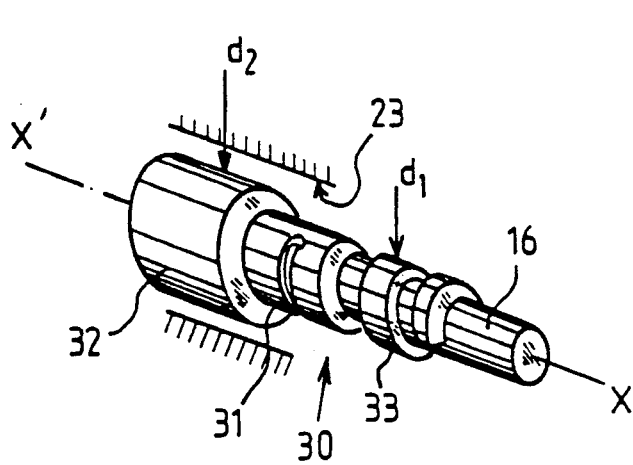
FIG. 5 shows, in a partial schematic perspective, a free wheel device using a helical spring.

Instead of this embodiment in which the two devices are placed radially in series between shaft 16 and body 2, an embodiment 30 of the articulation may be used in which the unidirectional coupling effect is obtained via a tubular part 31 having a smooth portion 32 and a portion 33 in the form of a helical spring, see FIG. 5; when the turns tighten slightly on shaft 16, jamming occurs if the shaft rotates in the winding direction and slipping in the opposite direction.

Portion 32 may be fitted directly with measured friction in bore 23 or a ring such as 27 may be used. It is clear that cage 25 of the preceding embodiment may also be fitted directly in a bore 23 of appropriate diameter and so with measured friction.

Figure 6:
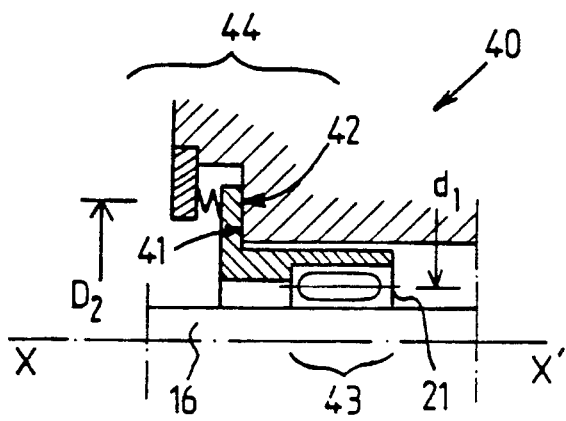
FIGS. 6 and 7 show schematically in partial axial sections two variants of a friction coupling device whose friction surfaces are placed perpendicularly to the articulation axis XX'.
Figure 7:
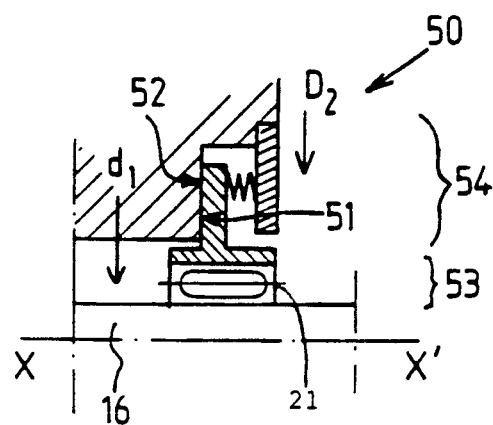

FIGS. 6 and 7 show variants in which the friction coupling devices 40, 50, respectively comprise surfaces 41, 42, 51, 52, respectively which are placed perpendicularly to axis XX'. In FIG. 6, a series mounting of the two free wheel 43, 53 and friction coupling 44, 54 devices is made parallel to the axis, whereas it is radial in FIG. 7. In both these cases, adjustable resilient means 43, 44, 53, 54, respectively confer a chosen value on the slipping torque.

In these examples, the two devices (friction coupling device and free wheel device) have different diameters $d_1$, $D_2$. It will be noted that in the example shown in FIG. 7, diameter $D_2$ of the friction coupling device 54 is greater than diameter $d_1$ of the free wheel device.

Figure 8:
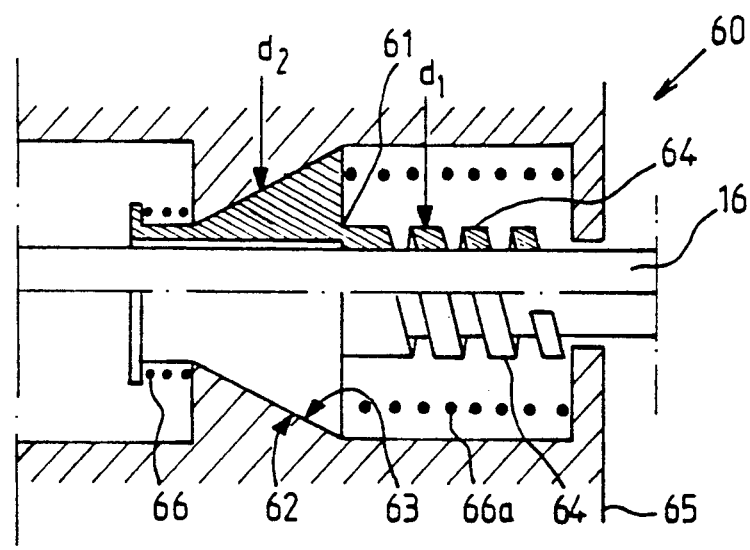
FIG. 8 is an axial section of an assembly comprising a free wheel device of the type shown in FIG. 5 and a friction coupling device with conical friction surfaces.

In FIG. 8, one embodiment 60 has been shown in which the friction coupling comprises a metal tubular part 61 with a conical surface 62 cooperating with a corresponding surface 63 of body 65 under the effect of an axial spring 66, or respectively 66a, and a helical winding 64 similar to the preceding one 33.

Of course, the invention is not limited to the above described embodiments.

Thus for example:

bearing 18, 19 could be placed on the left of the articulation device 14, this bearing 18, 19 could be omitted provided that the free wheel device 21, 22 is given an axial length compatible with the load which it would then support cantilever fashion, in the case of omitting bearing 18, 19, the increase in length may be obtained by placing the two free wheel devices 21, 22 in parallel in the articulation device 14.

Figure 9:
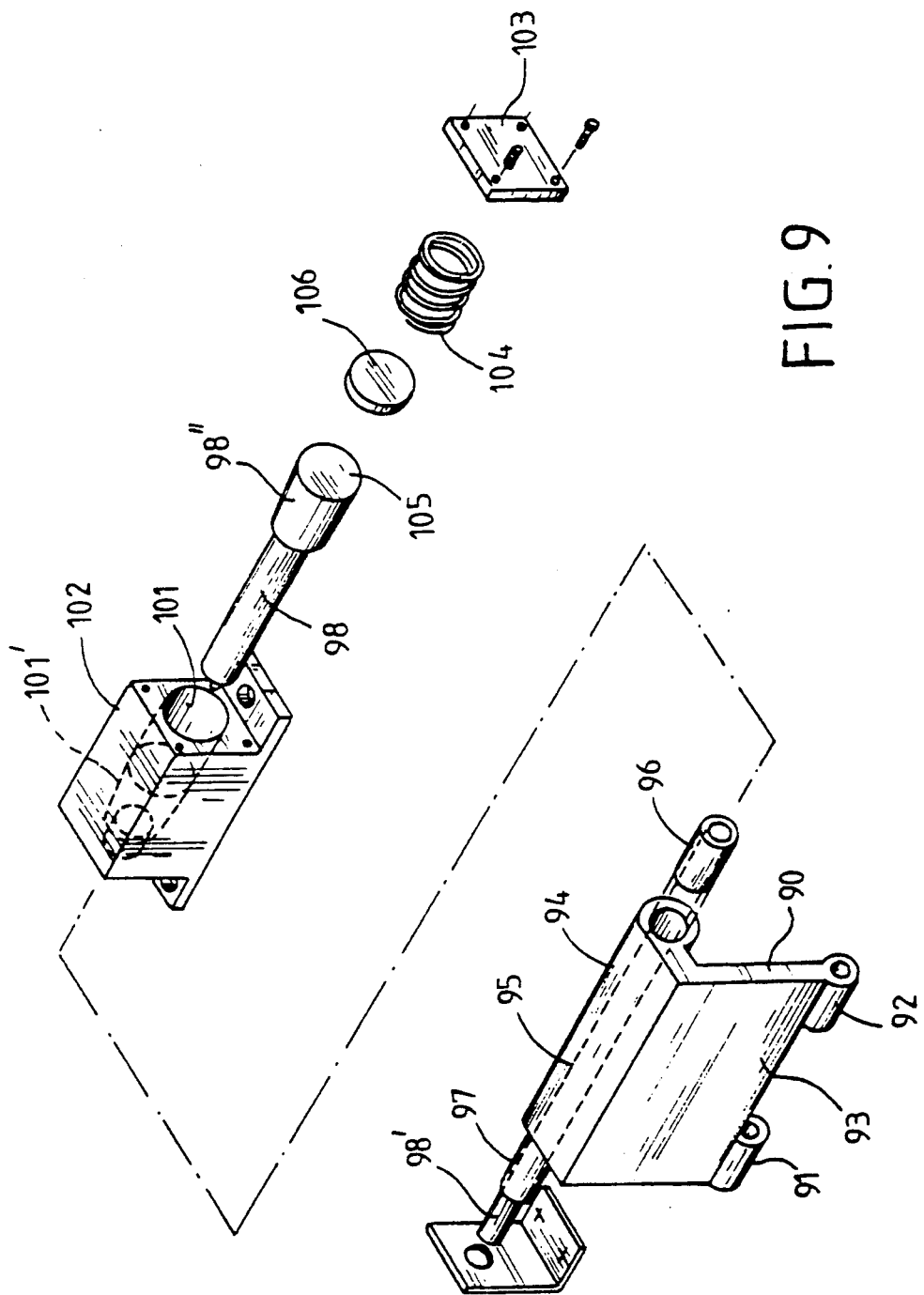
FIG. 9 is a schematic view in exploded perspective of another embodiment of an arm-screen articulation device comprising a free wheel device and a friction coupling device.

With reference to FIG. 9, articulation of arm 90 on the body of the apparatus is achieved by means of conventional coaxial hinge elements 91, 92, fixed to the edge 93 of said arm 90.

For articulating this arm 90 to the screen, it comprises, at the level of its edge 94 opposite edge 93, a cylindrical bore 95 directed parallel to the articulation axis of the hinge elements 91, 92.

Inside this bore are respectively engaged a free wheel device 96, for example of the type shown in FIG. 3, and a bearing 97 through which passes an articulation axis 98 which projects on each side of the arm to form two journals 98', 98". Of course shaft 98 pivots freely in bearing 97, whereas it is fixed to the inner cage of the free wheel device 96.

On the other hand, the external cage of this device 96 is fast with arm 90.

The journal 98', of cylindrical shape, is freely journalled in an articulation bracket 99 fixed to the screen. On the other hand, journal 98" has a convex truncated cone shape widening out away from arm 90. This journal 98" is engaged in a cavity 101 having a cylindrical truncated cone shape formed in a part 102 fixed to the screen, the conicity of the conical shape 101' of this cavity 101 being substantially identical to that of the truncated cone shape of journal 98" so that the two conical shapes may be applied one against the other to form a friction coupling.

The cylindrical truncated cone shaped cavity 101 opens to the outside on the side opposite arm 90 and may be closed on this side by a lid 103 fixed to part 102, for example by screwing.

The force of application of the truncated cone shape of journal 98" on the conical shape 101' of the cavity 101 is generated by a spring 104 bearing, on one side, on the radial end face 105 of journal 98", via a washer 106 and which is held, on the other side, by lid 103.

Of course, the invention also relates to the different embodiments of this device. Thus, for example, instead of using a single shaft 98, it would be possible to use two coaxial journals 98', 98" but separated from each other, these two journals engaging in two blind cavities formed in the arm (instead of a bore extending over the whole width of said arm).

I claim:

1. Portable information processing device comprising, on the one hand, a main body with a base intended to receive a power supply and processing circuits and, on the other hand, screen and/or keyboard dialogue means which are disposed in a flat box connected to the main body by means for supporting it and holding it in an angular position, which are adjustable both in height and angularly, wherein the holding means are disposed coaxially to a pivoting axis XX' of at least one support arm articulated on the main body and comprise a free wheel device oriented so as to allow a free elevation of the flat box with respect to the main body, and free wheel device being placed mechanically in series with an angular friction coupling device, these two devices being themselves coaxial with each other.

2. Information processing apparatus according to claim 1, wherein said two devices are placed axially one at the side of the other.

3. Information processing apparatus according to claim 1, further comprising an articulation device comprising a shaft mounted for rotation on said arm via a free wheel device and on the screen via a friction coupling device.

4. Information processing apparatus according to claim 2, wherein the free wheel device has a first diameter and the angular friction coupling device has a second diameter, the second diameter being greater than the first diameter.

5. Information processing apparatus according to claim 4, wherein the friction coupling device uses friction surfaces perpendicular to said pivoting axis XX'.

6. Information processing apparatus according to claim 2, wherein said free wheel device and said angular friction coupling device are placed radially one about the other the free wheel device having a first diameter and the angular friction coupling device having a second diameter greater than the first diameter.

7. Information processing apparatus according to claim 1, wherein the angular friction coupling device uses coaxial cylindrical surfaces.

8. Information processing apparatus according to claim 7, wherein the angular friction coupling device comprises an intermediate radially and resiliently compressible ring, which is disposed between said free wheel device and a bore of said main body, and which may slide angularly with respect thereto.

9. Information processing apparatus according to claim 8, wherein said intermediate ring is a metal ring having evenly spaced apart corrugations.

10. Information processing apparatus according to claim 1, wherein the free wheel device uses needles disposed between two substantially annular cages and has smooth and cylindrical surfaces, one external and the other internal.

11. Information processing apparatus according to claim 10, wherein the free wheel and the angular friction coupling devices form a bearing for a shaft fixed to an orientable arm and passing through a second coaxial bearing.

12. Information processing apparatus according to claim 1, wherein the free wheel device comprises helically wound tubular surfaces.

13. Information processing apparatus according to claim 11, wherein said angular friction coupling causes a convex truncated cone shape provided at the end of said shaft to cooperate with a concave cylindrical truncated cone shape formed in a part fast with the screen, said conical shapes being applied one against the other by means of a spring which acts on the end of the shaft.

* * * * *